United States Patent
Chiang et al.

(10) Patent No.: US 11,818,383 B2
(45) Date of Patent: Nov. 14, 2023

(54) METHODS AND APPARATUSES OF COMBINING MULTIPLE PREDICTORS FOR BLOCK PREDICTION IN VIDEO CODING SYSTEMS

(71) Applicant: HFI Innovation Inc., Zhubei (TW)

(72) Inventors: Man-Shu Chiang, Hsinchu (TW); Chih-Wei Hsu, Hsinchu (TW); Tzu-Der Chuang, Hsinchu (TW); Ching-Yeh Chen, Hsinchu (TW)

(73) Assignee: HFI Innovation Inc., Zhubei (TW)

( * ) Notice: Subject to any disclaimer, the term of this patent is extended or adjusted under 35 U.S.C. 154(b) by 0 days.

(21) Appl. No.: 17/283,338

(22) PCT Filed: Oct. 9, 2019

(86) PCT No.: PCT/CN2019/110131
§ 371 (c)(1),
(2) Date: Apr. 7, 2021

(87) PCT Pub. No.: WO2020/073920
PCT Pub. Date: Apr. 16, 2020

(65) Prior Publication Data
US 2021/0392364 A1 Dec. 16, 2021

Related U.S. Application Data

(60) Provisional application No. 62/845,965, filed on May 10, 2019, provisional application No. 62/744,126, filed on Oct. 10, 2018.

(51) Int. Cl.
*H04N 19/513* (2014.01)
*H04N 19/176* (2014.01)

(52) U.S. Cl.
CPC ......... *H04N 19/513* (2014.11); *H04N 19/176* (2014.11)

(58) Field of Classification Search
CPC .......................... H04N 19/513; H04N 19/176
See application file for complete search history.

(56) References Cited

U.S. PATENT DOCUMENTS

| | | | |
|---|---|---|---|
| 8,228,989 | B2 | 7/2012 | Kim et al. |
| 9,172,959 | B2 | 10/2015 | Yie et al. |
| (Continued) | | | |

FOREIGN PATENT DOCUMENTS

| | | |
|---|---|---|
| CN | 101653006 A | 2/2010 |
| CN | 103139564 A | 6/2013 |
| (Continued) | | |

OTHER PUBLICATIONS

International Search Report and Written Opinion dated Jan. 8, 2020, issued in application No. PCT/CN2019/110131.
(Continued)

*Primary Examiner* — Jessica M Prince
(74) *Attorney, Agent, or Firm* — Oblon, McClelland, Maier & Neustadt, L.L.P.

(57) ABSTRACT

Video processing methods and apparatuses for coding a current block generate a final predictor by combining multiple predictors for the current block. A first predictor and a second predictor for the current block are generated by applying one or a combination of settings to the first, second, or both predictors. One or both the first and second predictors are generated from motion compensation. The final predictor is derived from the first and second predictors, and the current block is encoded or decoded according to the final predictor. The settings include supported-mode setting, combined-weight setting, applied-portion setting, motion information setting, precision setting, or a combination of the above settings.

13 Claims, 9 Drawing Sheets

(56) References Cited

U.S. PATENT DOCUMENTS

| | | | |
|---|---|---|---|
| 9,906,786 B2 | 2/2018 | Seregin et al. | |
| 2007/0047648 A1 | 3/2007 | Tourapis et al. | |
| 2016/0255359 A1* | 9/2016 | Yu | H04N 19/91 375/240.15 |
| 2017/0244975 A1 | 8/2017 | Huang et al. | |
| 2018/0205964 A1* | 7/2018 | Mukherjee | H04N 19/46 |
| 2018/0270500 A1* | 9/2018 | Li | H04N 19/52 |
| 2018/0288410 A1* | 10/2018 | Park | H04N 19/157 |
| 2019/0182502 A1* | 6/2019 | Xu | H04N 19/176 |
| 2019/0215521 A1* | 7/2019 | Chuang | H04N 19/139 |
| 2020/0029073 A1* | 1/2020 | Chiang | H04N 19/176 |
| 2020/0036997 A1* | 1/2020 | Li | H04N 19/436 |
| 2020/0036998 A1* | 1/2020 | Xu | H04N 19/52 |
| 2020/0120334 A1* | 4/2020 | Xu | H04N 19/176 |
| 2021/0195177 A1* | 6/2021 | Zhang | H04N 19/30 |
| 2021/0314602 A1* | 10/2021 | Chiang | H04N 19/176 |
| 2021/0352320 A1* | 11/2021 | Leleannec | H04N 19/139 |

FOREIGN PATENT DOCUMENTS

| | | |
|---|---|---|
| CN | 104737537 A | 6/2015 |
| CN | 107079166 A | 8/2017 |
| CN | 107113425 A | 8/2017 |

OTHER PUBLICATIONS

Chinese language office action dated Mar. 31, 2021, issued in application No. TW 108136605.

Combined Chinese Office Action and Search Report dated Mar. 1, 2023 in Patent Application No. 201980066935.0 (with English translation of Category of Cited Documents), 10 pages.

Ru-Ling Liao, CE10: Triangular Prediction Unit Mode (CE10.3.1 and CE10.3.2), Joint Video Exploration Team (JVET) of ITU-T SG 16 WP 3 and ISO/IEC JTC 1/SC 29/WG 11, Ljubljana meeting, https://jvet-experts.org/ m43069—Document: JVET-K0144-v2, Jul. 2018 (6 pages).

\* cited by examiner

METHODS AND APPARATUSES OF COMBINING MULTIPLE PREDICTORS FOR BLOCK PREDICTION IN VIDEO CODING SYSTEMS

CROSS REFERENCE TO RELATED APPLICATION

The present invention claims priority to U.S. Provisional Patent Application, Ser. No. 62/744,126, filed on Oct. 10, 2018, entitled "Multiple hypothesis with weighting and motion settings", and U.S. Provisional Patent Application, Ser. No. 62/845,965, filed on May 10, 2019 entitled "Multiple hypothesis with improved weighting precision". The listed U.S. Provisional patent applications are hereby incorporated by reference in their entireties.

FIELD OF THE INVENTION

The present invention relates to video processing methods and apparatuses in video encoding and decoding systems. In particular, the present invention relates to predicting a current block by combining multiple predictors.

BACKGROUND AND RELATED ART

The High-Efficiency Video Coding (HEVC) standard is the latest international video coding standard developed by the Joint Collaborative Team on Video Coding (JCT-VC) group of video coding experts from ITU-T Study Group. The HEVC standard improves the video compression performance of its preceding standard H.264/AVC to meet the demand for higher picture resolutions, higher frame rates, and better video qualities. The HEVC standard is based on a hybrid block-based motion compensated DCT-like transform coding architecture. Each video slice is divided into multiple square Coding Tree Units (CTUs), where a CTU is the basic unit for video compression in HEVC. In the HEVC main profile, minimum and the maximum sizes of a CTU are specified by syntax elements signaled in the Sequence Parameter Set (SPS). A raster scan order is used to encode or decode CTUs in each slice. Each CTU may contain one Coding Unit (CU) or recursively split into four smaller CUs according to a quad-tree partitioning structure until a predefined minimum CU size is reached. At each depth of the quad-tree partitioning structure, an N×N block is either a single leaf CU or split into four blocks of sizes N/2×N/2, which are coding tree nodes. If a coding tree node is not further split, it is the leaf CU. The leaf CU size is restricted to be larger than or equal to the predefined minimum CU size, which is also specified in the SPS.

The prediction decision is made at the CU level, where each CU is coded using either inter picture prediction or intra picture prediction. Once the splitting of CU hierarchical tree is done, each CU is subject to further split into one or more Prediction Units (PUs) according to a PU partition type for prediction. The PU works as a basic representative block for sharing prediction information as the same prediction process is applied to all pixels in the PU. The prediction information is conveyed to the decoder on a PU basis. To achieve the best coding efficiency of hybrid coding architecture in HEVC, there are two kinds of prediction modes for each PU, including intra prediction and inter prediction. For intra prediction, spatial neighboring reconstructed pixels are used to generate directional prediction. There are up to 35 directions in HEVC. Motion estimation in inter prediction identifies one (uni-prediction) or two (bi-prediction) best reference blocks for a current block in one or two reference pictures, and motion compensation in inter prediction locates the one or two best reference blocks according to one or two motion vectors (MVs). A difference between the current block and a corresponding predictor is called prediction residual. The corresponding predictor is the best reference block when uni-prediction is used. When bi-prediction is used, the two reference blocks located by the two motion vectors are combined to form a final predictor. The prediction residual belonging to a CU is split into one or more Transform Units (TUs) according to another quad-tree block partitioning structure for transforming residual data into transform coefficients for compact data representation. The TU is a basic representative block for applying transform and quantization on the residual data. For each TU, a transform matrix having the same size as the TU is applied to the residual data to generate transform coefficients, and these transform coefficients are quantized and conveyed to the decoder on a TU basis.

The terms Coding Tree Block (CTB), Coding block (CB), Prediction Block (PB), and Transform Block (TB) are defined to specify two dimensional sample array of one color component associated with the CTU, CU, PU, and TU respectively. For example, a CTU consists of one luma CTB, two corresponding chroma CTBs, and its associated syntax elements.

Inter Prediction Modes There are three inter prediction modes in HEVC, including Advanced Motion Vector Prediction (AMVP), Skip, and Merge modes. Motion vector prediction is used in these inter prediction modes to reduce bits required for motion information coding. The motion vector prediction process includes generating a candidate list including multiple spatial and temporal motion candidates and pruning the candidate list to remove redundancy. A video encoder utilizes a Motion Vector Competition (MVC) scheme to select a final motion candidate among the spatial and temporal motion candidates in the candidate list. To encode PUs using AMVP mode, inter prediction directions, reference picture indices, Motion Vector Differences (MVDs), and prediction residual are transmitted in a video bitstream by the video encoder. The inter prediction direction of a PU describes the prediction direction such as list 0 (L0) prediction, list 1 (L1) prediction, or bi-directional prediction. A motion vector of a PU coded in AMVP mode is derived by adding a transmitted MVD with a selected Motion Vector Predictor (MVP) at the video decoder. An MVP index is also encoded and transmitted for each prediction direction to select one MVP from an AMVP candidate list. A default AMVP candidate list in HEVC includes two spatial motion candidates and one temporal motion candidate. FIG. 1 illustrates locations of the motion candidates for deriving a candidate list for a PB 10 coded in AMVP mode, Skip mode, or Merge mode. The two spatial motion candidates in the candidate list for AMVP mode include a left candidate and a top candidate. The left candidate for the current PB 10 is searched from below left to left, from block $A_0$ 111 to block $A_1$ 112, and the MV of the first available block is selected as the left candidate, while the top candidate is searched from above right to above left, from block $B_0$ 113, to block $B_1$ 114, and then block $B_2$ 115, and the MV of the first available block is selected as the top candidate. A block having motion information, or in other words, a block coded in inter picture prediction, is defined as an available block. The temporal motion candidate is the MV of a first available block selected from block $T_{BR}$ 121 adjacent to a bottom-right corner of a collocated block 12 and block $T_{CTR}$ 122 inside the collocated block 12 in a reference picture. The reference picture is indicated by signaling a flag and a reference picture index in a slice header to specify which reference picture list and which reference picture in the reference picture list is used.

To increase the coding efficiency of motion information coding in AMVP mode, Skip and Merge modes were proposed and adopted in the HEVC standard to further reduce the data bits required for signaling motion information by inheriting motion information from a spatially neighboring block or a temporal collocated block. For a PU coded in Skip or Merge mode, only an index of a selected final candidate is coded instead of the motion information, as the PU reuses the motion information of the selected final candidate. The motion information reused by the PU includes a motion vector (MV), an inter prediction indicator, and a reference picture index of the selected final candidate. It is noted that if the selected final candidate is a temporal motion candidate, the reference picture index is always set to zero to indicate the first reference picture in list 0 or list 1. Prediction residuals are coded when the PU is coded in Merge mode, however, the Skip mode further skips signaling of the prediction residual as the residual data of a PU coded in Skip mode is forced to be zero.

A Merge candidate list consists of up to four spatial motion candidates and one temporal motion candidate. As shown in FIG. 1, the first Merge candidate is motion information of a left block $A_1$ 112, the second Merge candidate is motion information of a top block $B_1$ 114, the third Merge candidate is motion information of a right above block $B_0$ 113, and a fourth Merge candidate is motion information of a left below block $A_0$ 111. Motion information of a left above block $B_2$ 115 is included in the Merge candidate list to replace a candidate of an unavailable spatial block. A fifth Merge candidate is motion information of a temporal block of first available temporal blocks $T_{BR}$ 121 and $T_{CTR}$ 122. The video encoder selects one final candidate from the candidate list for each PU coded in Skip or Merge mode based on a MVC scheme such as through a rate-distortion optimization (RDO) decision, and an index representing the selected final candidate is signaled to the video decoder. The video decoder selects the same final candidate from the candidate list according to the index transmitted in the video bitstream.

A pruning process is performed after deriving the candidate list for AMVP, Merge, or Skip mode to check the redundancy among candidates in the candidate list. After removing one or more redundant or unavailable candidates, the size of the candidate list could be dynamically adjusted at both the encoder and decoder sides, and an index for indicating the selected final candidate could be coded using truncated unary binarization to reduce the required data bits. However, although the dynamic size of the candidate list brings coding gain, it also introduces a potential parsing problem. A mismatch of the candidate list derived between the encoder side and the decoder side may occur when a MV of a previous picture is not decoded correctly and this MV is selected as the temporal motion candidate. A parsing error is thus present in the candidate list and it can propagate severely. The parsing error may propagate to the remaining current picture and even to the subsequent inter coded pictures that allow temporal motion candidates. In order to prevent this kind of parsing error propagation, a fixed candidate list size for AMVP mode, Skip mode, or Merge mode is used to decouple the candidate list construction and index parsing at the encoder and decoder sides. In order to compensate the coding loss caused by the fixed candidate list size, additional candidates are assigned to the empty positions in the candidate list after the pruning process. The index for indicating the selected final candidate is coded in truncated unary codes of a maximum length, for example, the maximum length is signaled in a slice header for Skip and Merge modes, and is fixed to 2 for AMVP mode in HEVC. The size of the AMVP candidate list is 2, so only the first two motion candidates are included in the AMVP candidate list after the derivation process of the two spatial and one temporal motion candidates.

For a candidate list constructed for a block coded in AMVP mode, a zero vector motion candidate is added to fill an empty position in the candidate list after derivation and pruning of two spatial motion candidates and one temporal motion candidate according to the current HEVC standard. As for Skip and Merge modes in HEVC, after derivation and pruning of four spatial motion candidates and one temporal motion candidate, up to three types of additional candidates are derived and added to fill the empty positions in the Merge candidate list if the number of available candidates is less than the fixed candidate list size. The three types of additional candidates used to fill the candidate list include a combined bi-predictive Merge candidate, a scaled bi-predictive Merge candidate, and a zero vector Merge/AMVP candidate.

The combined bi-predictive Merge candidate is created by combining two original motion candidates already included in the Merge candidate list according to a predefined order. An example of deriving a combined bi-predictive Merge candidate for a Merge candidate list is illustrated in FIG. 2. The Merge candidate list 22 in FIG. 2 only has two motion candidates mvL0_A with ref0 in list 0 and mvL1_B with ref0 in list 1 after the pruning process, and these two motion candidates are both uni-predictive motion candidates, the first motion candidate mvL0_A predicts the current block in the current picture 262 from a reference block in a past picture L0R0 264 (reference picture 0 in List 0) and the second motion candidate mvL1_B predicts the current block from a reference block in a future picture L1R0 266 (reference picture 0 in List 1). The combined bi-predictive Merge candidate combines the first and second motion candidates to form a bi-predictive motion vector with a motion vector points to a reference block in each list. The predictor of this combined bi-predictive motion candidate is derived by averaging the two reference blocks pointed by the two motion vectors. The updated candidate list 24 in FIG. 2 includes this combined bi-predictive motion candidate as the third motion candidate (MergeIdx=2).

The scaled bi-predictive Merge candidate is created by scaling an original uni-predictive Merge candidate in another list. For example, one original candidate has a motion vector in list X, mvLX, and a reference picture index in list X, refIdxLX, is used to create a bi-predictive Merge candidate, where X is 0 or 1. An example of deriving a scaled bi-predictive Merge candidate is shown in FIG. 3, where an original Merge candidate list 32 only has two motion candidates. A first motion candidate (MergeIdx=0) of a current block in a current picture 360 is a list 0 uni-predictive motion candidate with a motion vector mvL0_A and a reference picture index ref0 pointing to a reference block in a reference picture L0R0 362. To construct a scaled bi-predictive Merge candidate, the reference picture ref0 is first copied to a reference picture index ref0' in list 1, and a scaled motion vector mvL0'_A is calculated by scaling the motion vector mvL0_A with the reference pictures ref( ) and ref0'. The scaled motion vector mvL0'_A and the reference picture index ref0' points to a reference block in a reference picture L0R0 364. A bi-predictive Merge candidate, which has motion information (mvL0'_A, ref0) in list 0 and motion information (mvL0'_A, ref0') in list 1, is created and added into the third position (i.e. MergeIdx=2) of the Merge candidate list. Similarly, a scaled bi-predictive Merge candidate derived from a second motion candidate (MergeIdx=1) is inserted into the fourth position (i.e. MergeIdx=3) of the Merge candidate list. The second motion candidate is a list 1 uni-predictive motion candidate. The scaled bi-predictive Merge candidate derived from the second motion candidate has motion information (mvL1'_A ref1') in list 0 and motion information (mvL1_A, ref1) in list 1, pointing to two reference blocks in reference pictures L0R1 366 and L1R1 368.

The zero vector Merge/AMVP candidate is created by combining zero vectors and the reference indices are referred. FIG. 4 shows an example of inserting zero vector Merge candidates in a Merge candidate list or inserting zero vectors in an AMVP candidate list when there are still one or more empty positions and if the zero vector candidates are not duplicated.

Intra Prediction Modes For a current block coded in intra prediction mode, traditionally, the intra prediction method only exploits one reference tier adjacent to the current block and one of the intra prediction modes to generate predictors for the current block. The HEVC standard supports 35 intra prediction modes including 33 angular modes, DC mode and Planar mode. FIG. 5 illustrates the prediction directions for the 33 angular intra prediction modes of the HEVC standard, where H represents Horizontal direction mode and V represents Vertical direction mode. An intra prediction mode selected from the 35 intra prediction modes is signaled explicitly or inferred from previously decoded modes of above and left neighboring blocks of the current block. The intra prediction modes of the two neighboring blocks are included in a set of three Most Probable Modes (MPMs). A first MPM flag is signaled to indicate whether the selected mode is identical to one of the three MPMs, if so, another flag is sent to indicate which of the three MPMs is selected; if the first MPM flag is false, the selected intra prediction mode is explicitly signaled using a 5-bit fixed length codeword to choose one mode from the remaining 32 non-MPM modes.

The 33 angular modes shown in FIG. 5 can be expanded to a general case with more or less angular modes, where each of the angular modes can be represented by mode H+k or mode V+k, where H represents the direction of Horizontal mode, V represents the direction of Vertical mode, and k=0, +−1, +−2, ... +−K. For example, if 65 angular modes are used for intra prediction, k is ranged from −16 to 16, and mode H-16 and mode V-16 are the same mode as this mode refers to the prediction direction from an upper-left corner to the center of the current block.

Affine Prediction Four-parameter affine prediction is one of the newly developed coding techniques, which effectively tracks more complicated motion such as rotation, zooming, and deformation of moving objects. There are two major modes for affine motion prediction: affine Merge mode and affine Inter mode. Affine Merge mode allows the inheritance of affine motion information from a spatially neighboring block whereas affine Inter mode constructs several most probable candidates by combining motion information of spatially neighboring blocks. Motion occurs across pictures along temporal axis can be described by the four-parameter affine motion model as shown in Equation (1). Assuming A(x, y) is an original pixel at location (x, y) under consid-eration, and A'(x', y') is a corresponding reference pixel at location (x', y') in a reference picture for the original pixel A(x, y).

$$x'=ax+by+e, \text{ and}$$
$$y'=-bx+ay+f \quad (1)$$

where a, b, e and f are the four parameters in the four-parameter affine motion model.

The motion vector ($v_x$, $v_y$) between this original pixel A(x,y) and its corresponding reference pixel A'(x', y') in a block coded in an affine mode is described as:

$$v_x=(1-a)x-by-e, \text{ and}$$
$$v_y=(1-a)y+bx-f. \quad (2)$$

An exemplary four-parameter affine motion model is shown in FIG. 6. Two corner pixels 610 and 612 are located at upper-left and upper-right corners of a current block 602, and these two corner pixels are also called control points for the current block 602 in the four-parameter affine motion model. Motion vectors Mv0 and Mv1 of the two control points 610 and 612 map the current block 602 to a reference block 604 in a reference picture. The motion vector field of each pixel A(x,y) in the current block 602 may be derived based on the motion vectors Mv0 and Mv1 of the control points 610 and 612 according to Equation (3).

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (3)$$

where ($v_{0x}$, $v_{0y}$) represents the motion vector Mv0 at the upper-left corner 610, ($v_{1x}$, $v_{1y}$) represents the motion vector Mv1 at the upper-right corner 612, and w represents a width of the current block. For block-based affine motion compensation, when the motion vectors Mv0 and Mv1 of the two control points are decoded, the motion vector of each 4×4 block of the current block 602 can be determined according to Equation (3). In other words, the four-parameter affine motion model for the current block 602 can be specified by the two motion vectors Mv0 and Mv1 at the two control points.

An affine flag is signaled to indicate whether the affine Inter mode is applied to each inter mode CU when the CU size is equal to or larger than 16×16. A candidate motion vector predictor (MVP) pair list is constructed for a current CU using valid neighboring coded blocks if the current CU is coded or to be coded in affine Inter mode. FIG. 7 illustrates an example of the candidate MVP pair derivation for a current block 70 coded in affine Inter mode or affine Merge mode. As shown in FIG. 7, a motion vector predictor (MVP) for the motion vector Mv0 at an upper-left control point of the current block 70 is selected from motion vectors of upper-left neighboring coded blocks A0, A1, or A2; and a MVP for Mv1 at an upper-right control point of the current block 70 is selected from motion vectors of upper-right neighboring coded blocks B0 and B1. An MVP index for the candidate MVP pair list is signaled in a video bitstream and motion vector differences (MVDs) of the two control points are coded in the video bitstream.

For a current block 70 coded in Merge mode, five neighboring coded sub-blocks C0 (referred as the left-bottom block), B0 (referred as the top-right block), B1 (referred as the upper-right corner block), C1 (referred as the lower-left corner block), and A0 (referred as the upper-left corner block) in FIG. 7 are sequentially checked to determines whether any of the neighboring coded sub-blocks is coded in affine Inter mode or affine Merge mode. The current block 70 in this example is a prediction unit (PU). An affine flag is signaled to indicate whether the current block 70 is coded in affine Merge mode only if any of the neighboring coded sub-blocks is coded in affine Inter mode or affine Merge mode. When encoding or decoding the current block 70 according to affine Merge mode, a first available affine-coded neighboring block is determined by selecting from the five neighboring coded sub-blocks. The first available affine-coded neighboring block including the selected neighboring coded sub-block is used to derive an affine Merge candidate. The affine Merge candidate is used for deriving a predictor in a reference picture for the current block. The selection order for selecting one of the neighboring coded sub-blocks is from left-bottom block, top-right block, upper-right corner block, lower-left corner block to upper-left corner block (C0→B0→B1→C1→A0) as shown in FIG. 7. The affine Merge candidate for the current block 70 is derived from MVs at the control points of the first available affine-coded neighboring block, for example, the MVs of a top-left N×N sub-block and a top-right N×N sub-block of the first available affine-coded neighboring block are used to derive the affine Merge candidate. The affine parameters of the first available affine-coded neighboring block are used to derive the two control point MVs.

UMVE for Skip or Merge Mode Ultimate Motion Vector Expression (UMVE) is a new technique used for either Skip or Merge mode with a proposed motion vector expression method. UMVE first selects a candidate from multiple Merge candidates, and expends the candidate by the proposed motion vector expression method. A video encoder determines and signals prediction direction information, a starting point, a motion magnitude, and a motion direction for the motion vector expression method so that a corresponding video decoder parses and derived the same information for the motion vector expression method. The prediction direction information indicates a prediction direction among List 0 (L0), List 1 (L1), and bi-direction predictions. In B slice, a bi-prediction candidate can be generated from Merge candidates with uni-prediction using a mirroring technique. For example, to generate a bi-prediction candidate from a uni-predicted Merge candidate in L1, a reference index of L0 is decided by searching a reference picture in L0, which is mirrored with the reference picture for L1. In the case of no corresponding picture can be found, a nearest reference picture to the current picture is used. The MV in L0 is derived by scaling the MV in L1, and the scaling factor for scaling is calculated by Picture Order Count (POC) distance.

A first bit of an index for an UMVE prediction direction is 0 if the prediction direction of the UMVE candidate is the same as one of the original Merge candidates; otherwise the first bit with value 1 is signaled. After transmitting the first bit, a remaining prediction direction is signaled based on a predefined priority order of the UMVE prediction direction. The predefined priority order is bi-directional prediction, L0 prediction, and then L1 prediction. For example, if the prediction direction of the Merge candidate is L1, "0" is signaled for an UMVE prediction direction equals to L1, "10" is signaled for an UMVE prediction direction equals to bi-directional prediction, and "11" is signaled for an UMVE prediction direction equals to L0. If L0 and L1 prediction lists are exactly the same, UMVE prediction direction information is not signaled.

A base candidate index defines the starting point, where the base candidate index indicates a best candidate among Merge candidates in the Merge candidate list. A direction index represents the direction of the MVD relative to the starting point. The direction index represents one of the four directions: positive direction in x-axis, negative direction in x-axis, positive direction in y-axis, and negative direction in y-axis. To reduce the encoder complexity, UMVE is not applied to any block with a width or height less than 4.

BRIEF SUMMARY OF THE INVENTION

Methods of video data processing in a video encoding or decoding system utilizing a final predictor for predicting a current block in a current video picture, comprise receiving input data associated with the current block, generating a first predictor and a second predictor for the current block by applying one or a combination of settings to the first predictor, the second predictor, or both the first and the second predictors, generating a final predictor for the current block by combining the first predictor and the second predictor, and encoding or decoding the current block according to the final predictor. One or both of the first and second predictors for the current block are generated from motion compensation. A selection of the settings applied to one or both the predictors is implicitly determined, for example, the selection is derived by a block width of the current block, a block height of the current block, or both the block width and block height according to one embodiment. In another embodiment, a selection of the settings is explicitly indicated by a flag signaled at one or a combination of CU level, CTU level, slice level, tile level, tile group level, SPS level, and Picture Parameter Set (PPS) level. In one embodiment, one of the first and second predictors for the current block is generated from intra prediction.

The one or a combination of settings may include supported-mode setting, combined-weight setting, applied-portion setting, motion information setting, and precision setting. At least one of the first and second predictors is generated from motion compensation by at least one of existing inter prediction modes when the settings applied to the first and second predictors include supported-mode setting. Some examples of the existing inter prediction modes are one or a combination of Skip, Merge, AMVP, affine, affine Merge, affine Inter, and sub-block Merge modes. In one embodiment, an inter prediction mode for generating the first predictor and an inter prediction mode for generating the second predictor have to be the same. In another embodiment, an inter prediction mode for generating the first predictor and an inter prediction mode for generating the second predictor are determined according to a mapping table. Motion information for generating one or both the first and second predictors may be acquired through referencing previously coded motion information according to some embodiments, for example, the motion information for generating one or both the first and second predictors are acquired through a history-based scheme.

The final predictor is generated by summing up the first and second predictors with weightings when the settings applied to the first and second predictors include combined-weight setting. In some embodiments, the final predictor is further generated by right-shifting and clipping after weighting. The weightings may be varied with positions of prediction in the current block. In some embodiments of combined-weight setting, the current block is divided into sub-blocks, and each sub-block shares the same weighting. The weighting of each sub-block in the current block may depend on a block width of the current block, a block height of the current block, partition direction, sub-block position, sub-block MV, inter prediction direction, or a combination of the above. The weighting for one of the first and second predictors is set to zero so the other predictor is directly taken as the final predictor when a position of prediction in the current block is out of a particular margin according to one embodiment. The margin is defined along a vertical, horizontal, or diagonal direction.

The current block is divided into three regions when the setting applied to the first and second predictors include applied-portion setting. Prediction of a first region in the final predictor is derived from the first predictor, prediction of a second region in the final predictor is derived from the second predictor, and prediction of a third region in the final predictor is derived by combining the first and second predictors. For example, the first and second regions are triangular prediction units in the current block while the third region is a margin between the two triangular prediction units along a partition direction. In one embodiment, different weightings are applied to generate samples or sub-blocks of the third region in the final predictor.

Motion related information for generating one or both of the first and second predictors are modified or restricted for the purpose of meeting the bandwidth or complexity requirement. Reference pictures used for generating the first and second predictors of the current block are limited to be the same or within a predefined distance according to some embodiments of motion information setting. In another embodiment of motion information setting, only uni-predicted MVs are allowed to generate the first and second predictors for the current block.

A weighting process is applied to the first and second predictors to generate the final predictor for the current block before performing a rounding process at the end of motion compensation in an embodiment of applying precision setting to the first and second predictors. The rounding process limits values of the final predictor in a predefined range.

Aspects of the disclosure further provide an apparatus for video data processing in a video encoding or decoding system utilizing a final predictor for predicting a current block in a current video picture. The apparatus comprises one or more electronic circuits configured for receiving input data of the current block, generate a first and second predictor for the current block by applying one or a combination of settings to the first, second, or both predictors, generating a final predictor by combining the first and second predictors, encoding or decoding the current block according to the final predictor. One or both the first and second predictors for the current block are generated from motion compensation.

Aspects of the disclosure further provide a non-transitory computer readable medium storing program instructions for causing a processing circuit of an apparatus to perform a video processing method to encode or decode a current block. A final predictor for the current block is derived from combining multiple predictors generated by applying one or a combination of settings. The current block is encoded or decoded according to the final predictor. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, and wherein.

DETAILED DESCRIPTION OF THE INVENTION

Figure 1:
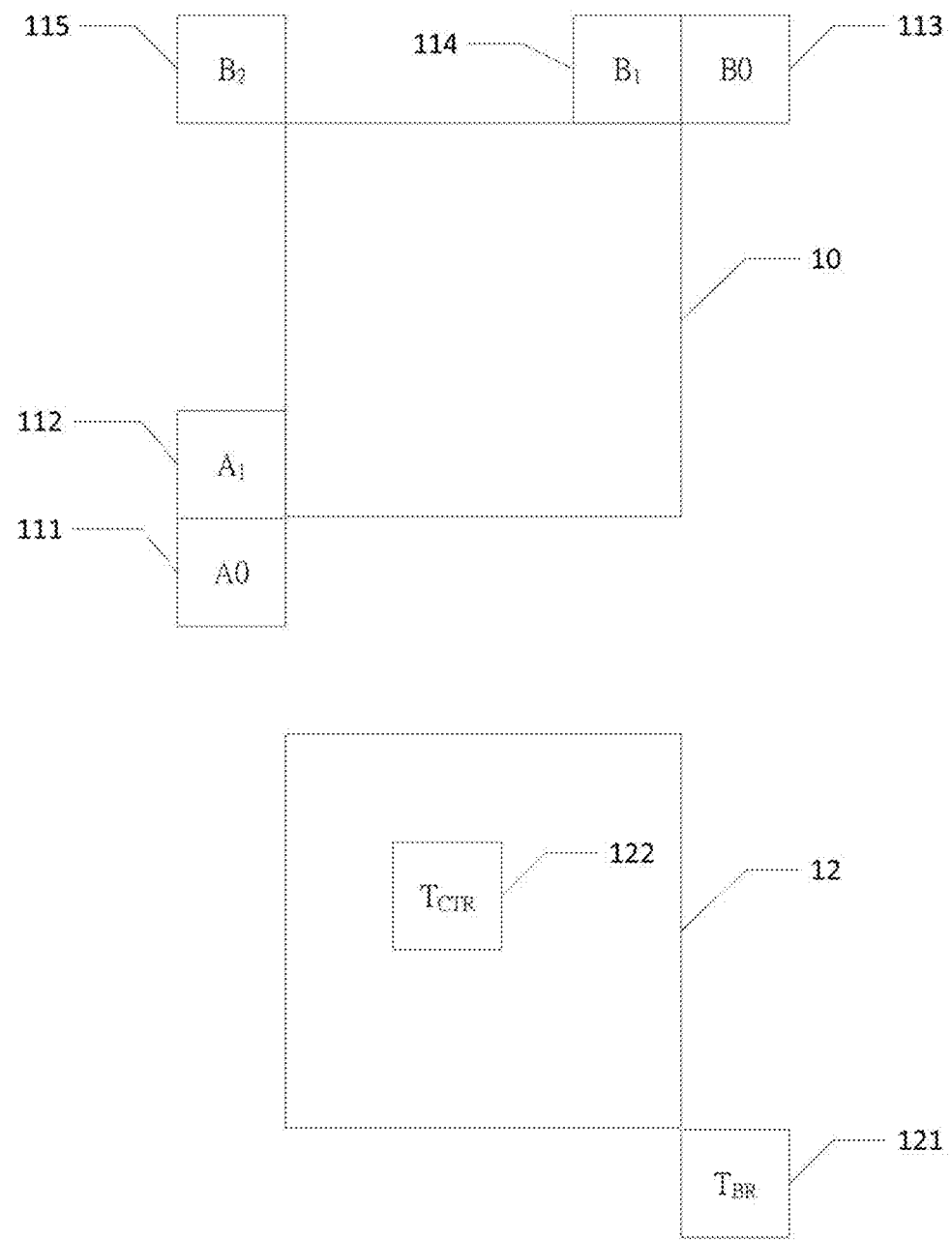
FIG. 1 illustrates locations of spatial candidates and temporal candidates for constructing a candidate list for AMVP mode, Skip mode, or Merge mode defined in the HEVC standard.
Figure 2:
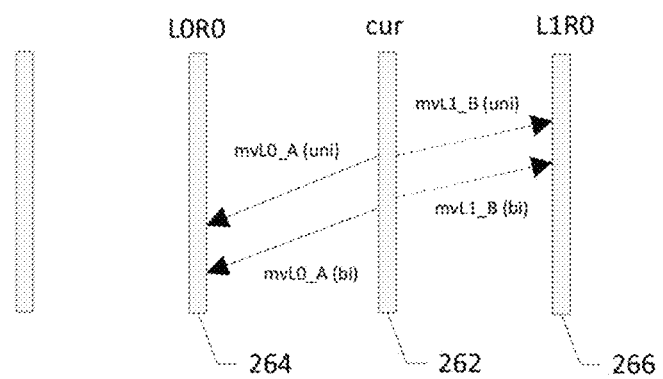
FIG. 2 illustrates an example of deriving a combined bi-predictive Merge candidate from two existing uni-directional motion candidates already existed in a Merge candidate list.
Figure 3:
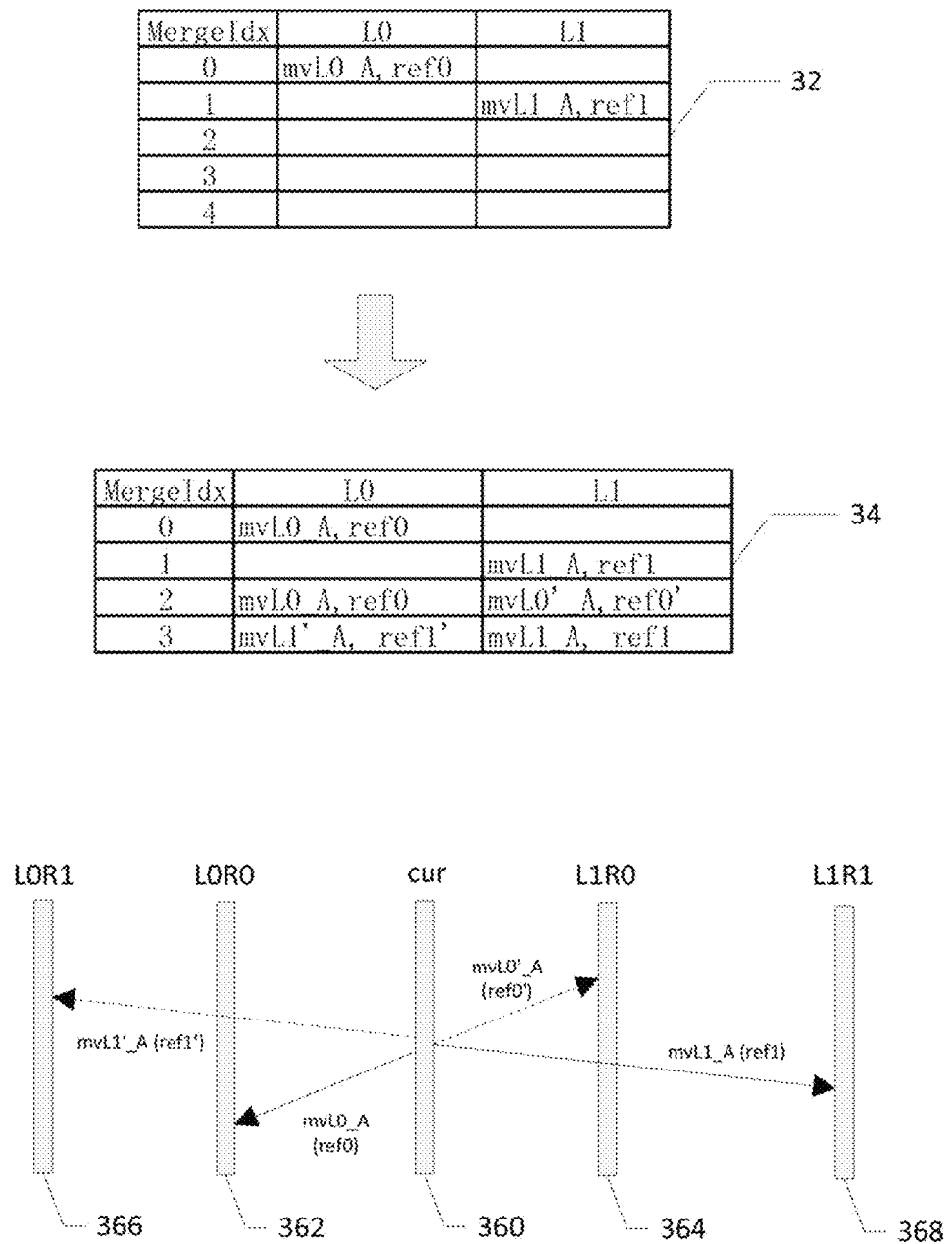
FIG. 3 illustrates an example of deriving two scaled bi-predictive Merge candidates from two existing uni-directional motion candidates already existed in a Merge candidate list.
Figure 4:
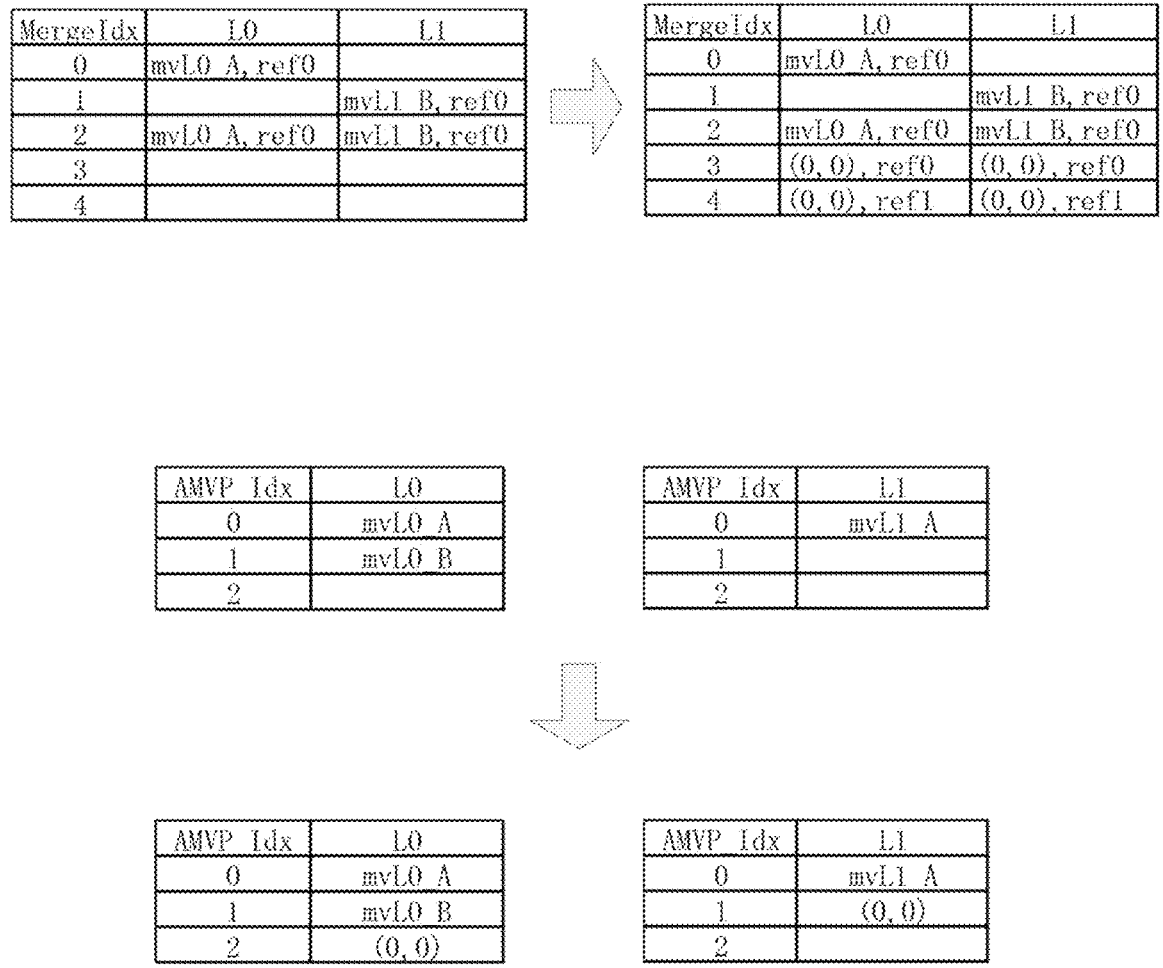
FIG. 4 illustrates examples of deriving zero vector Merge candidates and zero vector AMVP candidates for a Merge candidate list and AMVP candidate list.
Figure 5:
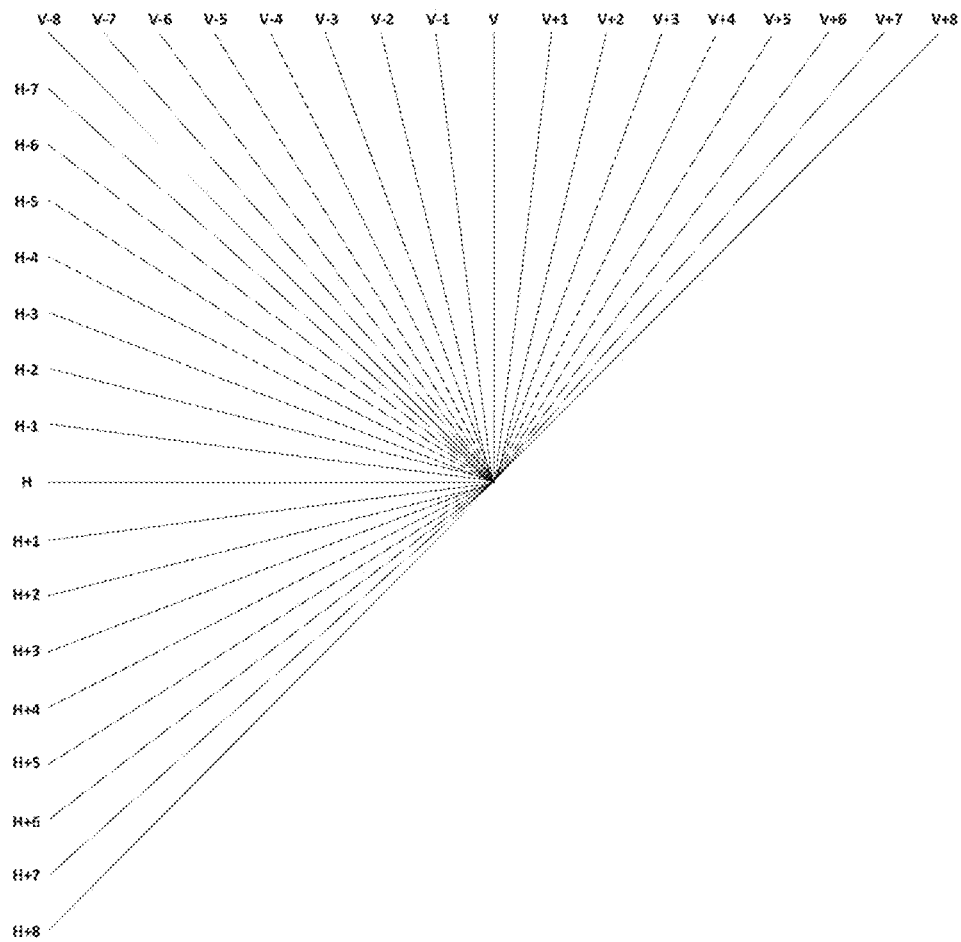
FIG. 5 illustrates 33 angular intra prediction modes supported in the HEVC standard.
Figure 6:
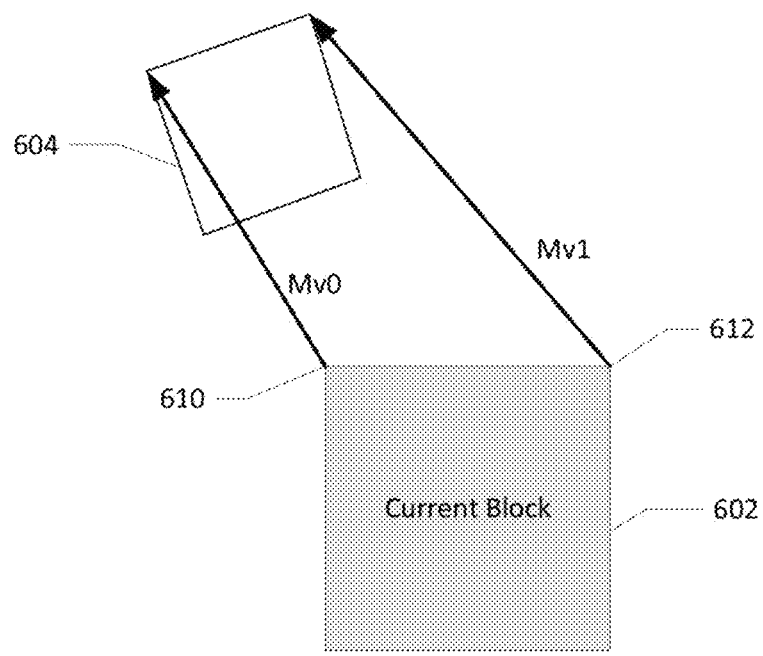
FIG. 6 illustrates four-parameter affine prediction mapping a current block to one or more compensated blocks according to two control points.
Figure 7:
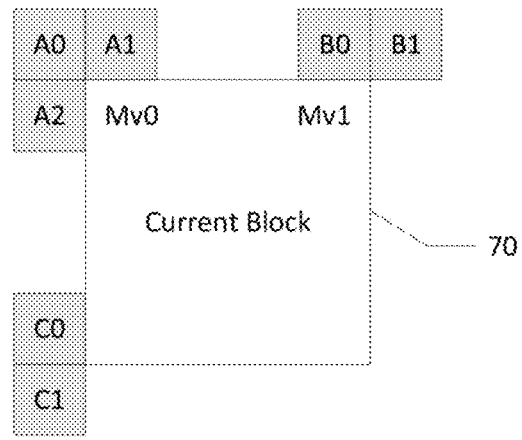
FIG. 7 illustrates an example of affine candidate derivation based on neighboring coded blocks for affine Inter mode or affine Merge mode.

In the following detailed description, numerous specific details of components and methods are set forth by way of examples in order to provide a thorough understanding of the present invention. Selected embodiments of the present invention generally described and illustrated in the figures herein, may be arranged, designed, and extended in a wide variety of different configurations. Any variations, derivations, or extensions based on the teachings described herein are within the protective scope of the present invention. In some instances, well-known methods or components pertaining to one or more embodiments disclosed herein may be described without giving details.

Embodiments of the present invention provide new methods of generating a final predictor by combining multiple predictors for encoding or decoding a current block. The current block is a PU, a leaf CU, or a sub-block in various different embodiments. The new methods combining multiple predictors improve one or more inter modes including Skip, Merge, AMVP, affine Merge, affine Inter, and sub-block Merge modes. The new methods are referred to as Multi-Hypothesis (MH) mode in the disclosure. The MH mode improves prediction accuracy of traditional inter or intra prediction by combining multiple predictors derived from different hypotheses. To encode or decode a current block using the MH mode according to some embodiments of the present invention, a first predictor for the current block is derived by Merge or Skip mode. One Merge index is used to select one motion candidate from a Merge candidate list for generating the first predictor for the current block. In one embodiment, the first predictor is a motion compensated predictor generated by uni-prediction or bi-prediction according to the selected motion candidate. In another embodiment, the first predictor can only be generated by uni-prediction in order to reduce the computational complexity. The first predictor is also referred to as the first hypothesis of prediction in MH mode. A second predictor for the MH mode is generated by motion compensation from Merge or Skip mode, AMVP mode, affine Merge mode, or affine Inter mode, or sub-block Merge mode, or the second predictor is generated by an intra prediction mode from intra prediction. The second predictor referred to as the second hypothesis of prediction in MH mode.

When multi-hypothesis mode is supported, one or more multi-hypothesis candidates are available for Skip, Merge, AMVP, affine Merge, affine Inter, sub-block Merge, or Intra mode. The multi-hypothesis mode is called MH mode for Intra when the second hypothesis of prediction is generated by an intra prediction mode, and the multi-hypothesis mode is called MH mode for Merge (or also called as MH mode for Inter) when the second hypothesis of prediction is generated from motion compensation by Merge, Skip, AMVP, affine Merge, affine Inter, or sub-block Merge mode. The following embodiments assume a final predictor is generated using two hypotheses of prediction; however, these embodiments may be extended to multi-hypothesis mode with more than two hypotheses of prediction.

A final predictor for predicting a current block is generated by combining first and second predictors. For example, the first predictor is derived from a candidate selected from a first candidate list by Motion Vector Competition (MVC) such as a Rate Distortion Optimization (RDO) decision at a video encoder side or by an index transmitted in a video bitstream at a video decoder side. The second predictor is derived from a candidate selected from a second candidate list by MVC at the video encoder side or by an index transmitted in the video bitstream at the video decoder side if the second predictor is a motion compensated predictor. An index indicating the selected candidate for deriving the first predictor, an index indicating the selected candidate for deriving the second predictor, along with prediction residual of the current block are signaled if both inter prediction modes for generating the two predictors are Merge mode, and only the indices indicating the selected candidates for deriving the first and second predictors are signaled if both the inter prediction modes for generating the two predictors are Skip mode. In some other embodiments, the second predictor is derived from an intra prediction mode selected at the video encoder side or determined at the video decoder side, an index indicating the selected candidate for deriving the first predictor along with prediction residual of the current block are signaled if an inter prediction mode for generating the first predictor is Merge mode, and only the index indicating the selected candidate is signaled for the current block if the inter prediction mode for generating the first predictor is Skip mode.

Various embodiments of multi-hypothesis mode predicting a current block according to one or a combination of settings are described in the following. The settings include any combination of supported-mode setting, combined-weight setting, applied-portion setting, motion information setting, and precision setting. These settings will be described in the following paragraphs. The one or more settings are applied to the first hypothesis, the second hypothesis, or more than one hypothesis of the MH mode. In one embodiment, the selection of the settings is implicitly determined, for example, the selection of the settings is derived by one or both of the block width and block height of the current block. In another embodiment, the selection of the settings is explicitly indicated by a flag signaled at CU level, CTU level, slice level, tile level, tile group level, Sequence Parameter Set (SPS) level, or Picture Parameter Set (PPS) level, or any combination of the above.

Supported-mode Setting The supported-mode setting implies the multi-hypothesis mode is applied in one or more existing inter prediction modes, for example, Skip, Merge, AMVP, affine Merge, affine Inter, and sub-block Merge modes. Motion information referred to the first or second hypotheses of prediction is generated from one of the mentioned inter prediction modes. In one specific embodiment, the inter prediction mode for the first hypothesis of prediction and the inter prediction mode for the second hypothesis of prediction have to be the same, and in another embodiment, the inter prediction modes for the two hypotheses of prediction can be different. In one embodiment, the inter prediction modes for the first and second hypotheses of prediction are predetermined according to a mapping table. For example, if the first hypothesis of prediction for a current block is predicted from an affine mode, the second hypothesis of prediction for the current block has to be predicted from Merge mode. In another embodiment, multi-hypothesis mode further supports one or more of the improved inter prediction modes. For example, UMVE candidates can be used to generate one or more hypotheses of prediction for a current block coded in multi-hypothesis mode. In another example, motion information for generating one or more hypotheses of prediction for a current block coded in multi-hypothesis mode is acquired through referencing previously coded motion information, such as through a history-based scheme. For example, the motion information used to generate a first predictor for the current block is retrieved from a memory buffer according to a history-based scheme which means using the motion information of a previously coded block. The blocks coded in the history-based scheme depend on a table with multiple history-based HMVP candidates. The table is maintained during the encoding/decoding process. For example, the table is emptied when a new slice is encountered. Whenever there is an inter-coded non-affine block, the associated motion information is added to the last entry of the table as a new HMVP candidate.

Combined-weight Setting By applying combined-weight setting, a final predictor of a current block is generated by summing up multiple hypotheses of prediction for the current block with weightings. In some embodiments of combined-weight setting, the final predictor of the current block is further generated by right-shifting and clipping after weighting. The weightings are fixed for each hypothesis of prediction or the weightings are varied with the position of prediction. For example, the weightings for the first and second hypotheses of prediction for a current block are 5 and 3 respectively. In one embodiment, the weightings for an original hypothesis of prediction are larger than the weightings for an additional hypothesis of prediction. For example, the first hypothesis is the original hypothesis and the second hypothesis is the additional hypothesis, in another example, the first hypothesis is the original hypothesis in some regions of the current block while the second hypothesis is the original hypothesis in some other regions of the current block. In some embodiments, for each hypothesis of prediction for a current block, each N×M sub-block in the current block shares the same weighting, or each pixel of the predictor for the current block has its own weighting, or any combination of the above. The size of the sub-blocks in the current block is N×M, where N and M are integers such as 2, 4, 8, 16, 32, 64, or 128. In another embodiment, the weightings for one hypothesis of prediction can be set to zero and the prediction of another hypothesis is directly taken as the final predictor of the current block when the position of prediction is out of a particular margin A, where the margin width w is an integer. The margin width w can be 0, 1, 2, 3, 4, 8, or 16, or can vary with the block width or block height of the current block, and the margin may be defined along a direction, such as a vertical, horizontal, or diagonal direction. In some embodiments, the weighting of each N×M sub-block in the current block depends on one or both of the block width and block height, partition direction, sub-block position in the CU or PU, sub-block MV, inter prediction direction, or a combination of the above.

Applied-portion Setting Pixels of a current block are divided into three regions, Region 1, Region 2, and Region 3, when predicting the current block according to applied-portion setting. Prediction of Region 1 in a final predictor for the current block is derived from one hypothesis of prediction, prediction of Region 2 in the final predictor is derived from another hypothesis of prediction, and prediction of Region 3 in the final predictor is generated by combining the two hypotheses of prediction. In one embodiment, Region 3 can include all the pixels in the current block; in this case, each pixel of the current block is predicted from the combination of multiple hypotheses of prediction. In one specific embodiment, a current block, such as a CU or a PU, is split into two triangular prediction units, in either diagonal or inverse diagonal direction. Region 1 is one triangular prediction unit, Region 2 is another triangular prediction unit, and Region 3 is the margin. The margin width can be 0, 1, 2, 3, 4, 8, 16, or 32, along the partition direction. In Region 3, the weighting for each sample, pixel, or N×M sub-block can be different according to an embodiment. The weightings may depend on the block width, block height, partition direction, sub-block position in the current block, sub-block M, inter prediction direction, or a combination thereof.

Motion Information Setting For motion information setting, motion information referred to one or more hypothesis of prediction can be restricted or modified according to a predefined requirement for the purpose of meeting the bandwidth or complexity requirement. In some embodiments of motion information setting, reference pictures used to generate multiple hypotheses for a current block have to be the same or within a predefined distance. In some embodiments, only uni-predicted motion vectors are allowed to generate hypotheses of prediction for a current block when motion information setting is applied. Any motion candidate fails to meet the predefined requirement in motion information setting is directly removed or modified to satisfy the predefined requirement. For example, if the reference picture of a motion candidate for one of the multiple hypotheses of prediction is different or out of a predefined distance, the motion candidate is set as invalid according to one embodiment or scaled to the same reference picture or a reference picture within the predefined distance according to another embodiment. For the embodiments of restricting bi-predicted motion vectors, if a motion candidate is bi-prediction, this motion candidate is viewed as an invalid candidate or divided into two uni-prediction candidates.

Precision Setting At the end of motion compensation, a predictor is generated for a current block, and a rounding process is performed to the generated predictor to limit the values of the predictor in a predefined range, which is presented in N bits, for example, N is 10. For a current block coded in multi-hypothesis mode, a first predictor is added with a second predictor, and a weighting process is required to combine the two predictors on the adjacent area or the entire block when combined-weight setting is applied. An example of the adjacent area is a vertical or horizontal edge between two rectangular prediction units, or a diagonal edge between two triangular prediction units. In some embodiments of implementing precision setting, a weighting process is applied to the multiple predictors before performing a rounding process at the end of motion compensation. In one embodiment, the weighting process is applied to an adjacent area according to a predefined weighting table. One benefit of applying the weighting process before the rounding process at the end of motion compensation is to make the weighting process for multi-hypothesis mode more unified with the blending process for a bi-prediction candidate in the regular inter or Merge candidate. For a current block coded in regular AMVP, Merge, or Skip mode, a final predictor of a bi-prediction candidate for the current block is generated by blending a predictor from list 0 and a predictor from list 1 at the end of motion compensation. Another benefit of applying the weighting process before the rounding process is that the weighting process for multi-hypothesis mode is performed in a higher precision so it is more accurate. In some other embodiments of implementing the precision setting, the weighting process is applied to the multiple predictors after performing the rounding process to each of the multiple predictors.

Any combination of the above described settings can be applied to generate one or more predictors for a current block coded in multi-hypothesis mode. In one exemplary embodiment, a CU is split into two triangular prediction units, in either diagonal or inverse diagonal direction according to the applied-portion setting. Each triangular prediction unit in the CU is inter-predicted using a uni-predicted motion vector and reference frame index according to the motion information setting. An adaptive weighting process is performed to the diagonal or inverse diagonal edge after generating the predictors for the triangular prediction units according to a combined-weighting setting to derive the diagonal or inverse diagonal edge of a final predictor. The remaining regions of the final predictor are original predictors derived from the uni-predicted motion vectors and reference frame indices. Although the weighting for each N×M sub-block located at the diagonal or inverse diagonal edge may be different, the weighting for pixels in each N×M sub-block is the same. The final predictor is used to encode or decode the current block. For example, at the encoder side, transform and quantization process is applied to the whole CU after generating residues between original pixels in the CU and the final predictor for the CU. At the decoder side, the final predictor of the CU is added to a recovered residual signal associated with the CU to reconstruct video data of the CU.

Figure 8:
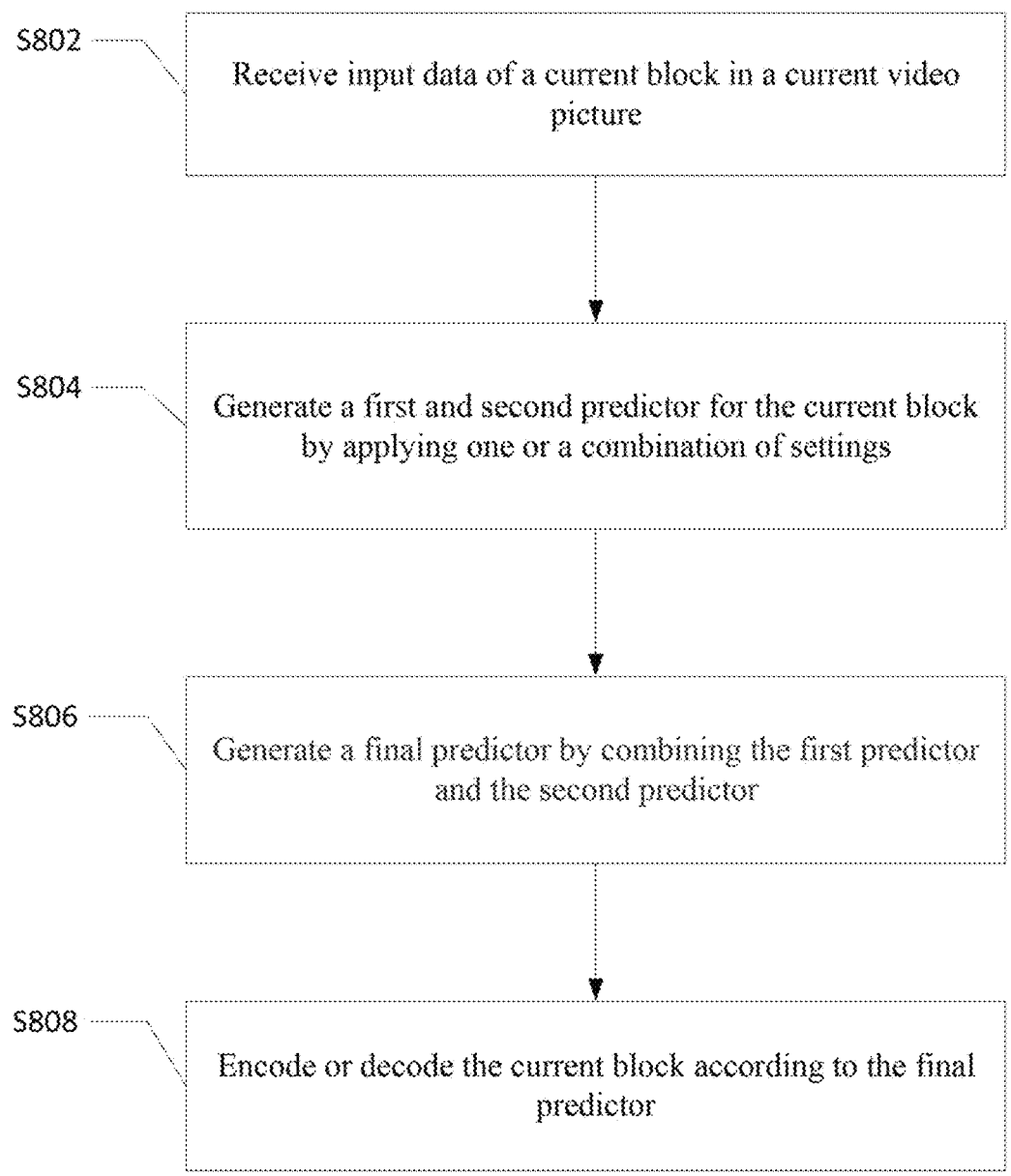
FIG. 8 is a flowchart illustrating an embodiment of processing a current block by combining multiple predictors with one or a combination of settings applied to the predictors.

Representative Flowchart of Exemplary Embodiment FIG. 8 conceptually illustrates an exemplary flowchart of a video encoding or decoding system for processing a current block predicted by a final predictor generated from combining multiple predictors. The exemplary embodiment shown in FIG. 8 derives a final predictor for a current block from two predictors. The video encoding or decoding system receives input data of the current block in a current video picture in Step S802, and generates a first predictor and a second predictor for the current block by applying one or a combination of settings to one or both the first and second predictors in Step S804. The final predictor for the current block is generated by combining the first and second predictors in Step S806, and the current block is encoded or decoded according to the final predictor in Step S808. Some examples of the settings applied to generate one or both the predictors are previously described supported-mode setting, combined-weight setting, applied-portion setting, motion information setting, and precision setting.

Figure 9:
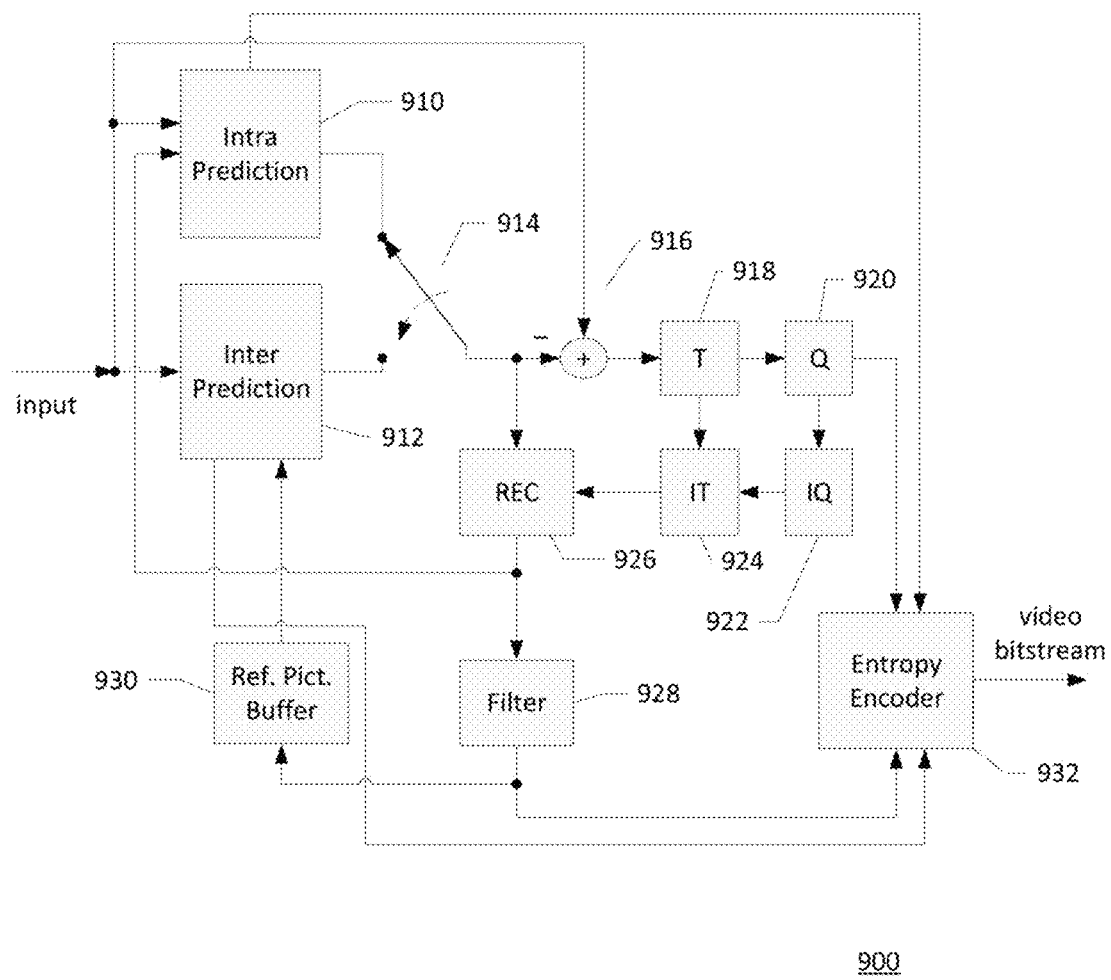
FIG. 9 illustrates an exemplary system block diagram for a video encoding system incorporating the video processing method according to embodiments of the present invention.

Video Encoder and Decoder Implementations The foregoing proposed video processing methods for generating a final predictor for a current block based on multiple predictors can be implemented in video encoders or decoders. For example, a proposed video processing method is implemented in one or a combination of an inter prediction module, intra prediction module, motion compensation module, and Merge candidate derivation module of an encoder or decoder. Alternatively, any of the proposed methods is implemented as a circuit coupled to one or a combination of the inter prediction module, intra prediction module, motion compensation module, Merge candidate derivation module of the encoder or decoder, so as to provide the information needed by the module. FIG. 9 illustrates an exemplary system block diagram of a Video Encoder 900 capable of implementing various embodiments of the present invention. Intra Prediction module 910 provides intra predictors based on reconstructed video data of a current picture. Inter Prediction module 912 performs motion estimation (ME) and motion compensation (MC) to provide inter predictors based on video data from one or more reference pictures. To encode a current block according to some embodiments of the present invention, a final predictor is generated based on multiple predictors according to one or a combination of settings. One or more of the multiple predictors are derived by Inter Prediction module 912, for example, the Inter Prediction module 912 generates both first and second predictors by motion compensation, and then the Inter Prediction module 912 generates the final predictor for predicting the current block by combining the first and second predictors. The Inter Prediction module 912 supplies the final predictor for the current block to Adder 916 to form prediction errors, which are also called prediction residual. In another example, the Inter Prediction module 912 generates the first predictor by motion compensation, and the Intra Prediction module 910 generates the second predictor by intra prediction. A final predictor for predicting the current block is then generated by combining the first and second predictors, and this final predictor is supplied to Adder 916 to form prediction errors. The prediction residual is set to zero if the current block is coded in Skip mode. When the current block is not coded in Skip mode, the prediction residual of the current block is further processed by Transformation module (T) 918 followed by Quantization module (Q) 920. The transformed and quantized residual signal is then encoded by Entropy Encoder 932 to form a video bitstream. The video bitstream is then packed with side information. The transformed and quantized residual signal of the current block is processed by Inverse Quantization module (IQ) 922 and Inverse Transformation module (IT) 924 to recover the prediction residual. As shown in FIG. 9, the prediction residual is recovered by adding back to the selected predictor at Reconstruction module (REC) 926 to produce reconstructed video data. The reconstructed video data may be stored in Reference Picture Buffer (Ref. Pict. Buffer) 930 and used for prediction of other pictures. The reconstructed video data recovered from Reconstruction module 926 may be subject to various impairments due to encoding processing; consequently, In-loop Processing Filter 928 is applied to the reconstructed video data before storing in the Reference Picture Buffer 930 to further enhance picture quality.

Figure 10:
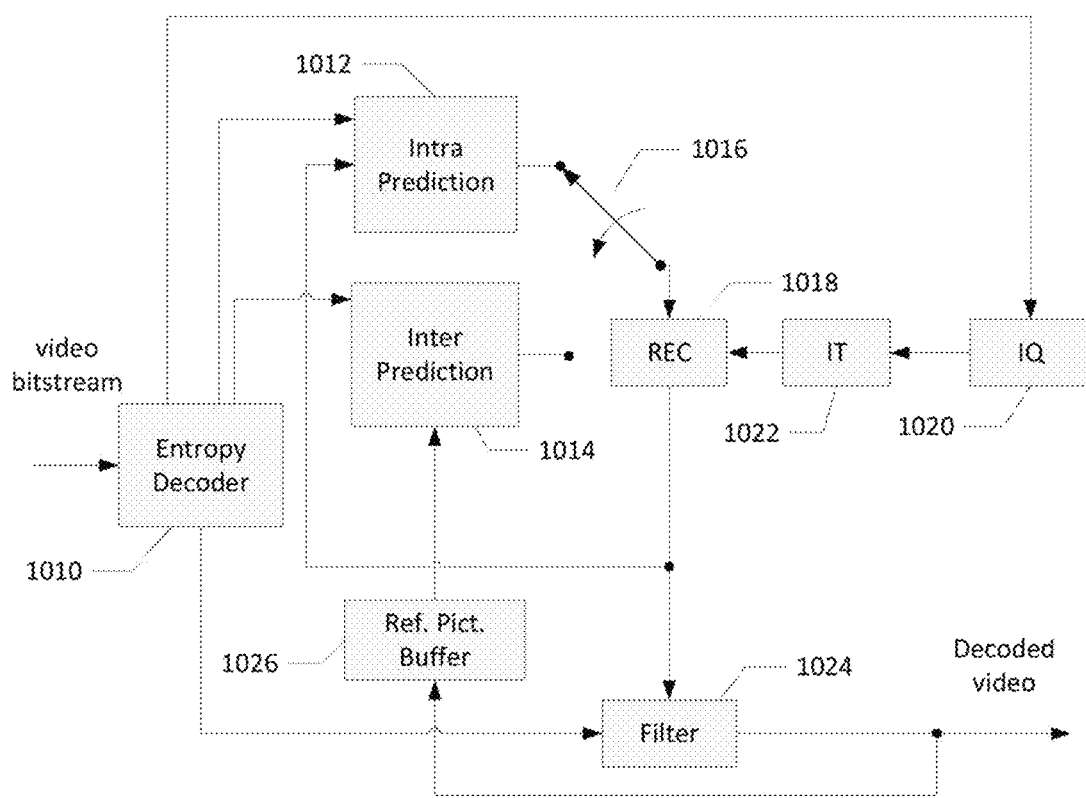
FIG. 10 illustrates an exemplary system block diagram for a video decoding system incorporating the video processing method according to embodiments of the present invention.

A corresponding Video Decoder 1000 for decoding the video bitstream generated from the Video Encoder 1000 of FIG. 10 is shown in FIG. 10. The video bitstream is the input to Video Decoder 1000 and is decoded by Entropy Decoder 1010 to parse and recover the transformed and quantized residual signal and other system information. The decoding process of Decoder 1000 is similar to the reconstruction loop at Encoder 900, except Decoder 1000 only requires motion compensation prediction in Inter Prediction module 1014. Each block is decoded by either Intra Prediction module 1012 or Inter Prediction module 1014. Switch 1016 selects an intra predictor from Intra Prediction module 1012 or an inter predictor from Inter Prediction module 1014 according to decoded mode information. When a current block is predicted by a final predictor derived by combining multiple predictors, Inter Prediction module 1014 generates one or both first and second predictors and derives a final predictor for the current block based on the first and second predictors. The transformed and quantized residual signal associated with a current block is recovered by Inverse Quantization module (IQ) 1020 and Inverse Transformation module (IT) 1022. The recovered residual signal is reconstructed by adding back the final predictor in REC module 1018 to produce reconstructed video. The reconstructed video is further processed by In-loop Processing Filter (Filter) 1024 to generate final decoded video. If the currently decoded picture is a reference picture for later pictures in decoding order, the reconstructed video of the currently decoded picture is also stored in Reference Picture Buffer 1026.

Various components of Video Encoder 900 and Video Decoder 1000 in FIG. 9 and FIG. 10 may be implemented by hardware components, one or more processors configured to execute program instructions stored in a memory, or a combination of hardware and processor. For example, a processor executes program instructions to control receiving of input data associated with a current block in a current video picture. The processor is equipped with a single or multiple processing cores. In some examples, the processor executes program instructions to perform functions in some components in Encoder 900 and Decoder 1000, and the memory electrically coupled with the processor is used to store the program instructions, information corresponding to the reconstructed images of blocks, and/or intermediate data during the encoding or decoding process. The memory in some embodiments includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable mediums listed above. As shown in FIGS. 9 and 10, Encoder 900 and Decoder 1000 may be implemented in the same electronic device, so various functional components of Encoder 900 and Decoder 1000 may be shared or reused if implemented in the same electronic device.

Embodiments of the video processing method for encoding or decoding according to one or a combination of settings applied to multiple predictors may be implemented in a circuit integrated into a video compression chip or program codes integrated into video compression software to perform the processing described above. For examples, generating a final predictor for the current block by combining the multiple predictors may be realized in program codes to be executed on a computer processor, a Digital Signal Processor (DSP), a microprocessor, or field programmable gate array (FPGA). These processors can be configured to perform particular tasks according to the invention, by executing machine-readable software codes or firmware codes that defines the particular methods embodied by the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of processing video data in a video encoding or decoding system, comprising:
   receiving input data associated with a current block in a current video picture;
   generating a first predictor and a second predictor for each pixel of the current block;
   generating a final predictor for said each pixel of the current block by combining the first predictor and the second predictor using weighting for said each pixel of the current block, wherein said each pixel of the current block has a weighting that is based on a partition direction for the current block,
   wherein the current block comprises three regions, wherein prediction of a first region in the final predictor is derived from the first predictor, prediction of a second region in the final predictor is derived from the second predictor, and prediction of a third region in the final predictor is derived by combining the first and second predictors, wherein the third region is a margin between the first and second regions, and
   wherein motion for generating the first predictor or the second predictor for the current block is retrieved from a memory buffer according to a history-based scheme using motion information of one or more previously coded blocks, wherein the history-based scheme depends on a table with multiple history-based HMVP candidates, and wherein when there is an inter-coded non-affine block, associated motion information is added to a last entry of the table as a new HMVP candidate; and
   encoding or decoding the current block according to the final predictor.

2. The method of claim 1, wherein the first predictor and the second predictor for each pixel of the current block are generated by applying one or a combination of settings to the first predictor, and wherein a selection of the settings is implicitly derived by one or both of a block width and block height of the current block.

3. The method of claim 1, wherein the first predictor and the second predictor for each pixel of the current block are generated by applying one or a combination of settings to the first predictor, and wherein a selection of the settings is explicitly indicated by a flag signaled at one or a combination of Coding Unit (CU) level, Coding Tree Unit (CTU) level, slice level, tile level, tile group level, Sequence Parameter Set (SPS) level, and Picture Parameter Set (PPS) level.

4. The method of claim 1, wherein one of the first and second predictors for the current block are generated from intra prediction.

5. The method of claim 1, wherein the first predictor and the second predictor for each pixel of the current block are generated by applying one or a combination of settings to the first predictor, and wherein the settings include supported-mode setting, at least one of the first and second predictors is generated from motion compensation by at least one of inter prediction modes, and the inter prediction modes include one or a combination of Skip, Merge, AMVP, affine Merge, affine Inter, and sub-block Merge modes.

6. The method of claim 1, wherein the first predictor and the second predictor for each pixel of the current block are generated by applying one or a combination of settings to the first predictor, and wherein the settings include combined-weight setting, the final predictor is generated by summing up the first and second predictors with weightings.

7. The method of claim 6, wherein the final predictor is further generated by right-shifting and clipping after weighting.

8. The method of claim 6, wherein the weightings are varied with positions of prediction in the current block.

9. The method of claim 6, wherein a weighting of each sub-block in the current block depends on a block width of the current block, a block height of the current block, partition direction, sub-block position, sub-block Motion Vector (MV), inter prediction direction, or a combination thereof.

10. The method of claim 1, wherein the first predictor and the second predictor for each pixel of the current block are generated by applying one or a combination of settings to the first predictor, and wherein the settings include precision setting, a weighting process is applied to the first and second predictors to generate the final predictor for the current block before applying a rounding process, and the rounding process is applied to the final predictor to limit values of the final predictor in a predefined range.

11. The method of claim 1, further comprising determining the partition direction for the current block, wherein the weighting of said pixel of the current block is further based on at least one of a position of the pixel, block width, or block height.

12. An apparatus of processing video data in a video encoding or decoding system, the apparatus comprising one or more electronic circuits configured for:
   receiving input data associated with a current block in a current video picture;
   generating a first predictor and a second predictor for each pixel of the current block;
   generating a final predictor for said each pixel of the current block by combining the first predictor and the second predictor using weighting for said each pixel of the current block, wherein said each pixel of the current block has a weighting that is based on a partition direction for the current block, wherein the current block comprises three regions, wherein prediction of a first region in the final predictor is derived from the first predictor, prediction of a second region in the final predictor is derived from the second predictor, and prediction of a third region in the final predictor is derived by combining the first and second predictors, wherein the third region is a margin between the first and second regions, and wherein motion for generating the first predictor or the second predictor for the current block is retrieved from a memory buffer according to a history-based scheme using motion information of one or more previously coded blocks, wherein the history-based scheme depends on a table with multiple history-based HMVP candidates, and wherein when there is an inter-coded non-affine block, associated motion information is added to a last entry of the table as a new HMVP candidate; and encoding or decoding the current block according to the final predictor.

13. A non-transitory computer readable medium storing program instruction causing a processing circuit of an apparatus to perform video processing method, and the method comprising:

receiving input data associated with a current block in a current video picture;

generating a first predictor and a second predictor for each pixel of the current block;

generating a final predictor for said each pixel of the current block by combining the first predictor and the second predictor using weighting for said each pixel of the current block, wherein said each pixel of the current block has a weighting that is based on a partition direction for the current block, wherein the current block comprises three regions, wherein prediction of a first region in the final predictor is derived from the first predictor, prediction of a second region in the final predictor is derived from the second predictor, and prediction of a third region in the final predictor is derived by combining the first and second predictors, wherein the third region is a margin between the first and second regions, and wherein motion for generating the first predictor or the second predictor for the current block is retrieved from a memory buffer according to a history-based scheme using motion information of one or more previously coded blocks, wherein the history-based scheme depends on a table with multiple history-based HMVP candidates, and wherein when there is an inter-coded non-affine block, associated motion information is added to a last entry of the table as a new HMVP candidate; and encoding or decoding the current block according to the final predictor.

\* \* \* \* \*